(12) United States Patent
Murakami et al.

(10) Patent No.: US 8,931,817 B2
(45) Date of Patent: *Jan. 13, 2015

(54) ROBOT HAND

(71) Applicant: Seiko Epson Corporation, Tokyo (JP)

(72) Inventors: Kenjiro Murakami, Matsumoto (JP); Kazuto Yoshimura, Shimosuwa (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/785,812

(22) Filed: Mar. 5, 2013

(65) Prior Publication Data

US 2013/0181466 A1    Jul. 18, 2013

Related U.S. Application Data

(63) Continuation of application No. 13/342,397, filed on Jan. 3, 2012, now Pat. No. 8,408,619.

(30) Foreign Application Priority Data

Jan. 6, 2011   (JP) ................................. 2011-000982

(51) Int. Cl.
 *B25J 15/08* (2006.01)
 *B66C 1/42* (2006.01)
 *B25J 15/10* (2006.01)

(52) U.S. Cl.
 CPC ..... *B25J 15/08* (2013.01); *B25J 15/10* (2013.01); *Y10S 901/31* (2013.01); *Y10S 901/39* (2013.01)
 USPC .............. 294/119.1; 294/213; 901/39; 901/31

(58) Field of Classification Search
 USPC ................ 294/2, 86.4, 207, 213, 106, 119.1; 623/57, 64; 901/31, 36, 39; 269/34, 37, 269/87.1, 109
 See application file for complete search history.

(56) References Cited

U.S. PATENT DOCUMENTS

| | | | | |
|---|---|---|---|---|
| 1,000,725 | A | * | 8/1911 | Duus .............................. 269/109 |
| 1,342,891 | A | * | 6/1920 | Bergstrom ..................... 269/109 |
| 1,966,338 | A | * | 7/1934 | Eggimann ..................... 269/107 |
| 3,069,761 | A | | 12/1962 | Sommer |
| 3,306,646 | A | | 2/1967 | Flora, Jr. |
| 4,273,506 | A | | 6/1981 | Thomson et al. |
| 4,479,673 | A | | 10/1984 | Inaba et al. |
| 4,600,357 | A | | 7/1986 | Coules |

(Continued)

FOREIGN PATENT DOCUMENTS

| | | |
|---|---|---|
| DE | 299 02 968 | 7/1999 |
| EP | 0 060 896 A1 | 9/1982 |

(Continued)

OTHER PUBLICATIONS

Extended European Search Report for Application No. 12 15 0060 mailed Mar. 23, 2012 (6 pages).

*Primary Examiner* — Paul T Chin

(74) *Attorney, Agent, or Firm* — Harness, Dickey & Pierce, P.L.C.

(57) ABSTRACT

An aspect of the invention provides a robot hand that performs an action for gripping an object between plural finger sections provided to be capable of changing a distance between the finger sections. Between the plural finger sections, a palm section movable along a direction in which a base side of the plural finger sections and a distal end side of the plural finger sections are connected is provided.

8 Claims, 7 Drawing Sheets

(56) References Cited

U.S. PATENT DOCUMENTS

| | | | |
|---|---|---|---|
| 4,623,183 | A | 11/1986 | Aomori |
| 4,653,793 | A | 3/1987 | Guinot et al. |
| 4,676,541 | A | 6/1987 | Lord et al. |
| 4,723,806 | A | 2/1988 | Yuda |
| 4,768,428 | A | 9/1988 | Silvestrini et al. |
| 4,984,951 | A | 1/1991 | Jameson |
| 5,378,033 | A | 1/1995 | Guo et al. |
| 5,538,305 | A | 7/1996 | Conway et al. |
| 6,244,644 | B1 | 6/2001 | Lovchik et al. |
| 6,264,419 | B1 | 7/2001 | Schinzel |
| 7,370,896 | B2 * | 5/2008 | Anderson et al. ............. 294/106 |
| 8,424,942 | B2 * | 4/2013 | Park et al. ..................... 294/106 |
| 2003/0090115 | A1 | 5/2003 | Kim et al. |
| 2003/0102640 | A1 | 6/2003 | Saito |
| 2006/0012197 | A1 | 1/2006 | Anderson et al. |
| 2006/0263270 | A1 | 11/2006 | Rizzotte et al. |
| 2008/0023925 | A1 | 1/2008 | Tomita et al. |
| 2012/0175903 | A1 * | 7/2012 | Murakami et al. ........... 294/207 |

FOREIGN PATENT DOCUMENTS

| | | |
|---|---|---|
| JP | 57-061487 | 4/1982 |
| JP | 59-059375 | 4/1984 |
| JP | 59-156642 | 9/1984 |
| JP | 61-019577 | 1/1986 |
| JP | 02-106516 | 4/1990 |
| JP | 04-109883 B2 | 9/1992 |
| JP | 05-220687 | 8/1993 |
| JP | 06-024517 | 2/1994 |
| JP | 06-030862 | 4/1994 |
| JP | 06-328383 | 11/1994 |
| JP | 07-017488 | 3/1995 |
| JP | 07-205080 | 8/1995 |
| JP | 11-033969 | 2/1999 |
| JP | 2000-117677 | 4/2000 |
| JP | 2002 080126 | 3/2002 |
| JP | 2004-223676 A | 8/2004 |
| JP | 3717218 | 9/2005 |
| JP | 2007-139360 | 6/2007 |
| JP | 2010-201538 A | 9/2010 |
| JP | 2012-143835 A | 8/2012 |
| WO | WO-2005-065264 A2 | 7/2005 |

* cited by examiner

ROBOT HAND

CROSS-REFERENCE TO RELATED APPLICATIONS

This is a continuation application of U.S. application Ser. No. 13/342,397 filed Jan. 3, 2012 which claims priority to Japanese Patent Application No. 2011-000982, filed Jan. 6, 2011 all of which are expressly incorporated by reference herein in their entireties.

BACKGROUND

1. Technical Field

The present invention relates to a robot hand that can grip an object.

2. Related Art

According to the progress of robot technologies in recent years, industrial robots are used inmost of manufacturing sites of industrial products. For example, in an assembly line for industrial products, it is a widespread practice to set plural industrial robots along the line and assemble various components to a product under manufacturing carried on the line using the robots to improve manufacturing efficiency. When such components assembled by the robots are conveyed to a line side, it is a widespread practice to convey the components using robots to improve manufacturing efficiency of the entire factory.

The industrial robots used in the assembly line and the like in this way handle objects having various sizes and shapes in work for conveying a component and work for assembling the conveyed component to a product. Therefore, a section (a robot hand) with which a robot grips an object is required to have high universality that enables the robot hand to cope with various objects. Therefore, robot hands that can grip components having various sizes and shapes are proposed (JP-A-2000-117677 and JP-B-06-30862).

However, the proposed robot hands have a problem in that it is difficult to grip components having various sizes and shapes with sufficient gripping force. Reasons for the difficulty are as explained below. First, the robot hands grip an object by holding the object with plural finger sections provided to be generally opposed to one another. Therefore, it is possible to grip objects having various sizes (or shapes) by changing a distance between the finger sections according to the size of an object. However, the object is merely retained by friction force in a contact portion in a state in which the object is held between the finger sections. It goes without saying that the friction force can be increased if the finger sections are strongly pressed against the object. However, there is a limit in the increase in the friction force because it is likely that the surface of the object is damaged. After all, the object cannot be gripped with sufficient force. As a result, for example, when work for gripping some small component and assembling the component to something is performed, various problems could occur, for example, the gripped component is shifted by reaction applied to the component during the assembly and the component cannot be assembled.

SUMMARY

An advantage of some aspects of the invention is to provide a robot hand that can grip components having various sizes and shapes with sufficient gripping force.

An aspect of the invention is directed to a robot hand that performs an action for gripping an object between plural finger sections provided to be capable of changing a distance between the finger sections. Between the plural finger sections, a palm section movable along a direction in which a base side of the plural finger sections and a distal end side of the plural finger sections are connected is provided.

In the robot hand according to the aspect having such a configuration, it is possible to change the distance between the plural finger sections according to the size and the shape of an object to grip the object and move the palm section to the distal end side of the finger sections to bring the palm section into contact with the object. Therefore, it is possible not only to retain the object with friction force generated between the object and the plural finger sections but also to support the object from the base side of the finger sections using the palm section. As a result, it is possible to grip objects having various sizes and shapes with sufficient gripping force.

As explained above, the object gripped by the robot hand according to the aspect is supported from the base side of the finger sections by the palm section. Therefore, for example, even if the object is subjected to reaction when work for gripping the object and assembling the object to something is performed, the object does not shift from a position where the object is gripped to the base side of the finger sections. Therefore, it is possible to surely assemble the object gripped by the robot hand.

In the robot hand according to the aspect explained above, the palm section may be provided movable independently from the motion of the plural finger sections. Consequently, it is possible to surely bring the plural finger sections and the palm section into contact with objects having various sizes and shapes and grip the objects. Therefore, it is possible to improve universality of the robot hand.

In the robot hand according to the aspect explained above, the palm section may be provided movable at least to the position of a surface position with respect to the distal ends of the plural finger sections.

Consequently, it is possible to expose the palm section in the position of the distal ends of the finger sections. Therefore, for example, during assembly work by the robot hand, it is possible to perform work for pressing, with the palm section, a positioned object against a target such as an industrial product to thereby push the object into the target.

In the robot hand according to the aspect explained above, the palm section may be provided movable in association with the motion of the plural finger sections. Consequently, it is possible to grip objects having various sizes and shapes, for example, by setting the palm section to move to the distal end side of the plural finger sections when the distance between the plural finger sections is reduced and move to the base side of the plural finger sections when the distance between the plural finger sections is increased. It is possible to simplify control of the robot hand by collectively controlling the motion of the plural finger sections and the motion of the palm section.

In the robot hand according to the aspect explained above, gripping surfaces that come into contact with the object when the object is gripped may be formed in the plural finger sections. Portions where a space between the gripping surfaces of the finger sections opposed to each other narrows from the palm section side toward the distal ends of the finger sections may be provided on the gripping surfaces.

Consequently, it is possible to hold to grip the object with the palm section and the portions where the gripping surfaces of the finger sections narrow toward the distal ends. As a result, it is possible to surely fix objects having various sizes and shapes on the inside of the robot hand.

The robot hand according to the aspect explained above has an extremely simple structure and is easily reduced in size and weight. Therefore, if a robot is configured using a plurality of the robot hands according to the aspect, it is possible to configure a small and high-performance robot.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
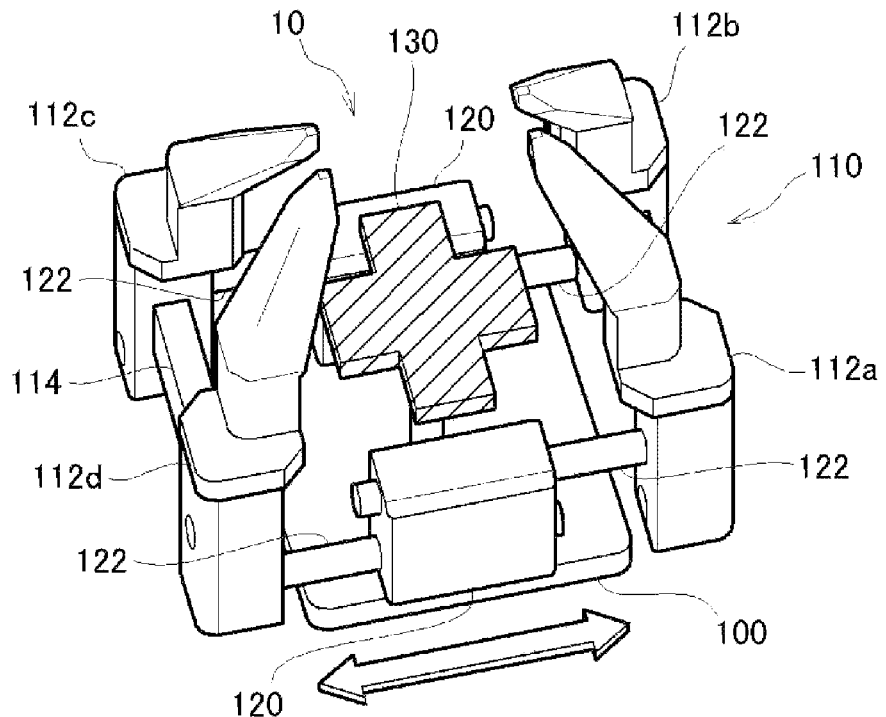
FIGS. 1A and 1B are explanatory diagrams showing the configuration of a robot hand according to an embodiment.
Figure 1B:
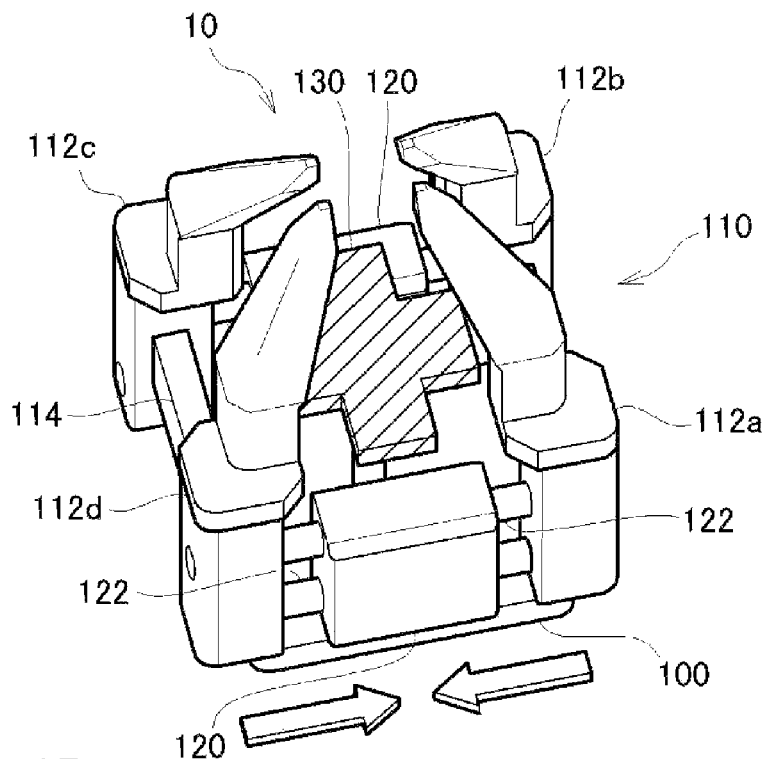

An embodiment is explained below according to the following order in order to clarify contents of the invention.
A. Structure of a robot hand according to this embodiment
B. Gripping action of the robot hand according to this embodiment
C. Modification A. Configuration of the Robot Hand According to this Embodiment FIGS. 1A and 1B are explanatory diagrams showing the configuration of a robot hand 10 according to this embodiment. As shown in the figures, the robot hand 10 according to this embodiment includes a hand base 100 that is a substantially rectangular tabular member and forms a base portion of the robot hand 10, a finger section unit 110 attached to the upper surface of the hand base 100, and a palm section 130 provided in the position in the center of the finger section unit 110.

The finger section unit 110 includes four finger sections 112 (finger sections 112a, 112b, 112c, and 112d). The finger sections 112 are arranged in the positions at four corners of the hand base 100. The adjacent finger sections 112 are connected to each other in sections of bases thereof to be integrally configured. When it is not specifically necessary to distinguish the finger sections 112 in the following explanation, the finger sections 112 are referred to as finger sections 112 without being distinguished according to positions where the finger sections 112 are arranged.

Guide sections 120 having a substantial box shape are respectively provided between two finger sections on the front side on the paper surface (the finger sections 112a and 112d) and two finger sections on the back side on the paper surface (the finger sections 112b and 112c) among the four finger sections 112. From the finger sections 112 adjacent to the guide sections 120, guide shafts 122 provided at different heights are respectively extended to the guide sections 120. The guide shafts 122 respectively pierce through guide holes provided in positions of the guide sections 120 corresponding to the guide shafts 122, whereby the two finger sections (the finger section 112a and the finger section 112d or the finger section 112b and the finger section 112c) adjacent to the guide section 120 are connected slidably in directions in which the finger sections move close to or away from each other.

The finger section 112a in the right front on the paper surface and the finger section 112b in the right back on the paper surface are coupled by a coupling member 114 and integrated. The finger section 112d in the left front on the paper surface and the finger section 112c in the left back on the paper surface are also coupled by the coupling member 114 and integrated. In the finger section unit 110 according to this embodiment configured in this way, when not-shown actuators incorporated in the guide sections 120 explained above are driven in predetermined directions, as shown in FIG. 1A, in a state in which the finger sections on the right side on the paper surface (the finger sections 112a and 112b) and the finger sections on the left side on the paper surface (the finger sections 112c and 112d) of the robot hand 10 are respectively integrated, the finger sections 112 on the right side and the finger sections 112 on the left side move in directions in which the finger sections 112 move away from each other. In the state in which the finger sections 112 on the left and right are separated from each other in this way (a state shown in FIG. 1A), when the actuators (not shown) in the guide sections 120 are driven in directions opposite to the predetermined directions explained above, as shown in FIG. 1B, the finger sections 112 on the right side and the finger sections 112 on the left side are respectively integrated and move in directions in which the finger sections 112 on the right side and the finger sections 112 on the left side move close to each other.

In this way, in the robot hand 10 according to this embodiment, it is possible to change, by moving the opposed left and right finger sections 112 close to or away from each other, a distance between the finger sections 112 according to the size and the shape of an object about to be gripped. In addition, in the robot hand 10 according to this embodiment, it is possible to move the palm section 130 provided in the position in the center of the finger section unit 110 as explained below.

Figure 2A:
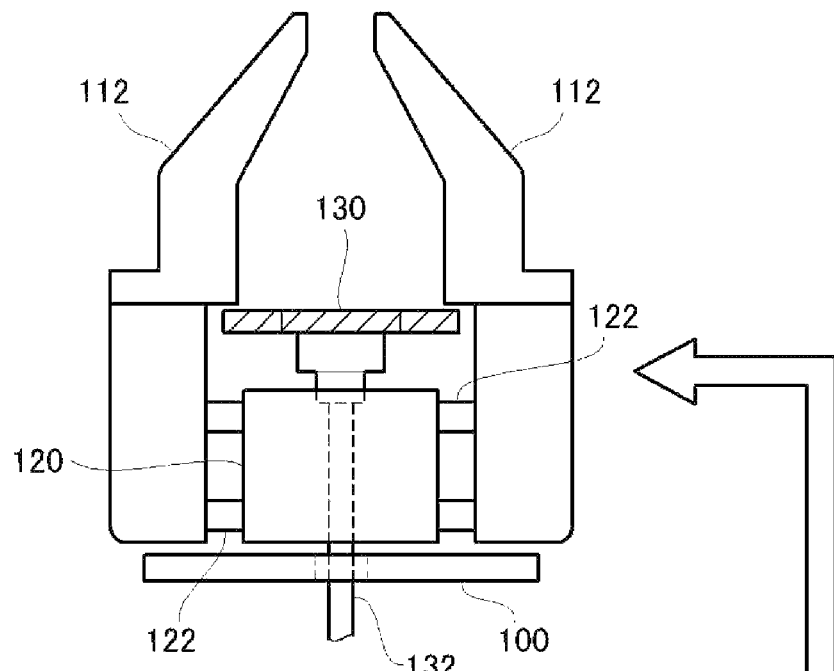
FIGS. 2A and 2B are explanatory diagrams showing the motion of a palm section of the robot hand according to the embodiment.
Figure 2B:
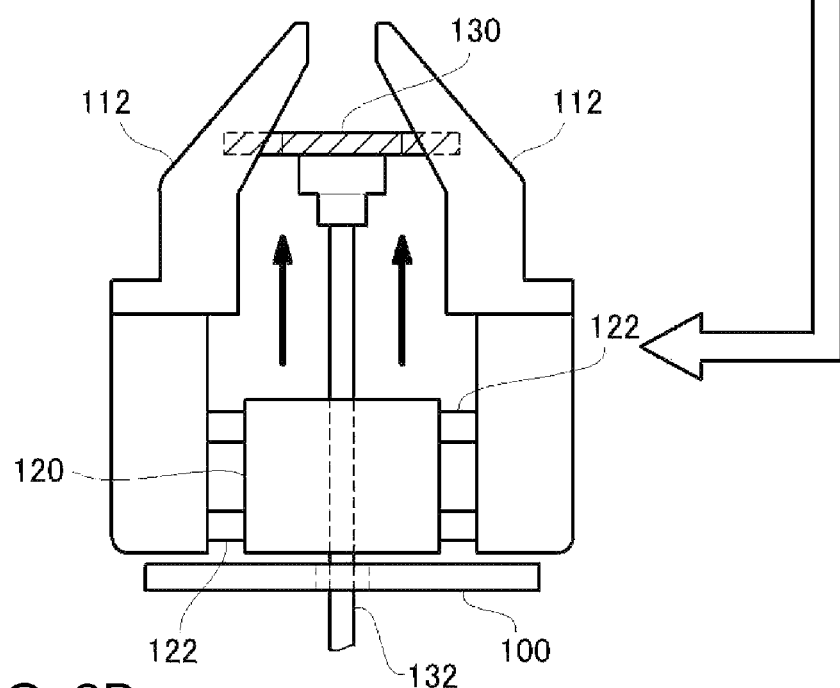

FIGS. 2A and 2B are explanatory diagrams showing the motion of the palm section 130 of the robot hand 10 according to this embodiment. In FIGS. 2A and 2B, a state of the robot hand 10 shown in FIGS. 1A and 1B viewed from the front side is shown. As shown in FIG. 2A, when the robot hand 10 does not grip an object, the palm section 130 of the robot hand 10 is housed around the bases of the finger sections 112. On the rear surface of the palm section 130 (the surfaces on the base side of the finger sections 112), a ball screw 132 provided from the hand base 100 side to the palm section 130 is attached in a rotatable state.

The ball screw 132 is connected to a not-shown driving motor on the opposite side of a side in contact with the palm section 130. By rotating the ball screw 132 with the driving motor, it is possible to move the palm section 130 in the direction of the distal ends of the finger sections 112 (see FIG. 2B) and move the palm section 130 to the base side of the finger sections 112 (see FIG. 2A). Since the palm section 130 is provided movable in this way, the robot hand 10 according to this embodiment can grip an object with sufficient gripping force compared with the robot hand in the past. The gripping of an object by the robot hand 10 is explained below.

B. Gripping Action of the Robot Hand According to this Embodiment

Figure 3A:
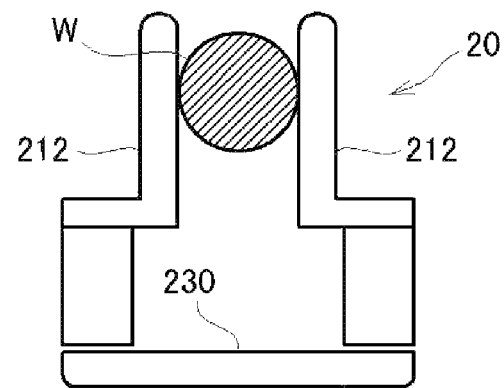
FIGS. 3A to 3C are explanatory diagrams showing a state in which the robot hand according to the embodiment grips an object.
Figure 3B:
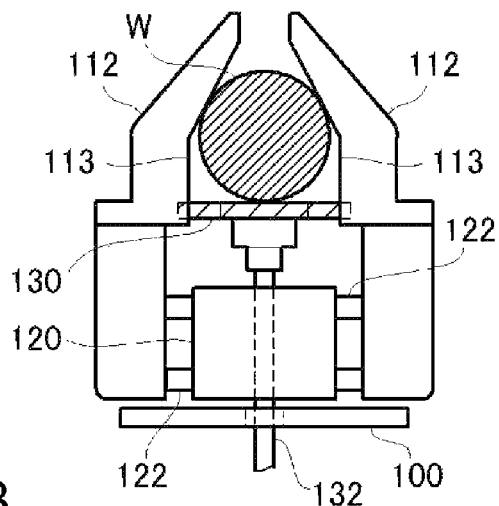
Figure 3C:
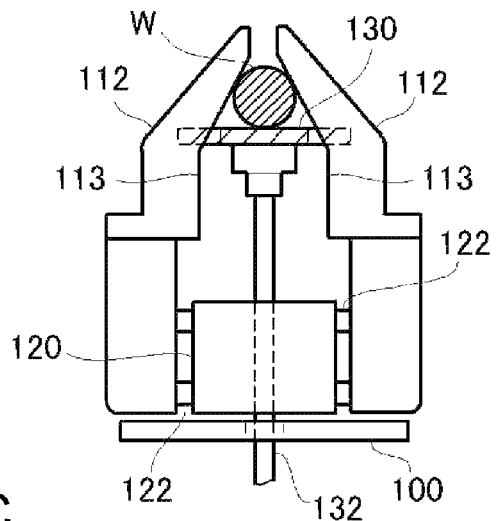

FIGS. 3A to 3C are explanatory diagrams showing a state in which the robot hand 10 according to this embodiment grips an object. In FIG. 3A, a state in which a robot hand 20 in the past grips an object W is shown as reference. In FIGS. 3B and 3C, a state in which the robot hand 10 according to this embodiment grips the object W is shown.

In the robot hand 20 in the past shown in FIG. 3A, a pair of opposed finger sections 212 are provided on the upper surface of a palm section 230. The finger sections 212 can be moved close to or away from each other by a not-shown driving mechanism. As shown in FIG. 3A, such a robot hand 20 in the past grips the object W by holding the object W between the finger sections 212. At this point, the object W is retained between the finger sections 212 by friction force generated in contact portions of the object W and the finger sections 212.

On the other hand, when the object W is gripped using the robot hand 10 according to this embodiment, as shown in FIG. 3B, first, the robot hand 10 brings the left and right finger sections 112 close to each other to thereby hold the object W with the surfaces on the inner side (gripping surfaces 113) of the finger sections 112 opposed to the object W and, in this state, moves the palm section 130 in the direction of the distal ends of the finger sections 112 and brings the palm section 130 into contact with the object W. When the object W smaller than the object W shown in FIG. 3B is gripped using the robot hand 10, as shown in FIG. 3C, the robot hand 10 brings the gripping surfaces 113 of the left and right finger sections 112 closer to each other to hold the small object W and, in this state, further moves the palm section 130 to the distal end side of the finger sections 112 to bring the palm section 130 into contact with the small object W.

As explained above, the robot hand 10 according to this embodiment brings the palm section 130 into contact with the object W after holding the object W with the finger sections 112. However, the robot hand 10 may hold the object W with the finger sections 112 after bringing the palm section 130 into contact with the object W or may simultaneously perform an action for holding the object W with the finger sections 112 and an action for bringing the palm section 130 into contact with the object W.

In this way, in the robot hand 10 according to this embodiment, the palm section 130 is provided movable between the base side and the distal end side of the finger sections 112. Therefore, the robot hand 10 can bring the palm section 130 into contact with the object W irrespective of the size (or the shape) of the object W. Consequently, force for supporting the object W from the base side of the finger sections 112 with the palm section 130 can be applied to the object W in addition to friction force generated between the finger sections 112. As a result, compared with the retaining the object W with the friction force generated in the contact portions of the object W and the finger sections 212 as in the robot hand 20 in the past explained above (see FIG. 3A), it is possible to grip objects W having various sizes and shapes with sufficient gripping force.

In the finger sections 112 of the robot hand 10 according to this embodiment, portions where the gripping surfaces 113 narrow toward the distal ends of the finger sections 112 viewed from the palm section 130 are provided. By providing such portions in the finger sections 112, it is possible to hold to grip the object W with the palm section 130 and the narrowing portions of the gripping surfaces 113. Therefore, it is possible to surely fix the objects W having various sizes and shapes on the inside of the robot hand 10.

When the object W is held and gripped by the finger sections 212 as in the robot hand 20 in the past, if the finger sections 212 are strongly pressed against the object W to increase friction force, it is possible to grip the object W with sufficient force. However, it is undesirable to increase the force for pressing the finger sections 212 against the object W because it is likely that the surface of the object W is damaged by pressure from the finger sections 212. In this regard, since the robot hand 10 according to this embodiment supports the object W with the palm section 130, the robot hand 10 can sufficiently grip the object W even if the finger sections 112 are not so strongly pressed against the object W. As a result, while it is possible to secure sufficient gripping force, the object W is not damaged.

As explained above, since the palm section 130 of the robot hand 10 according to this embodiment simply linearly moves in the direction in which the base side and the distal end side of the finger sections 112 are connected (see FIGS. 2A and 2B), it is possible to cause the palm section 130 to act with simple control. Therefore, while it is possible to sufficiently grip the object W by providing the palm section 130 movable, the control of the robot hand 10 is not complicated.

In addition, since the robot hand 10 has a simple structure, it is possible to reduce the robot hand 10 in size and weight. Therefore, even when the robot hand 10 is moved at high speed in order to improve a cycle time, since an increase in energy necessary for the high-speed movement can be suppressed, it is possible to prevent energy efficiency of the entire robot (or the entire line) from falling. Further, since the structure of the robot hand 10 is simple, it is also possible to inexpensively provide the robot hand 10 having such excellent characteristics.

If the robot hand 10 according to this embodiment is used, it is possible to obtain advantageous effects explained below not only when the object W is gripped as explained above but also when work for assembling the gripped object W to, for example, a product on a manufacturing line.

Figure 4A:
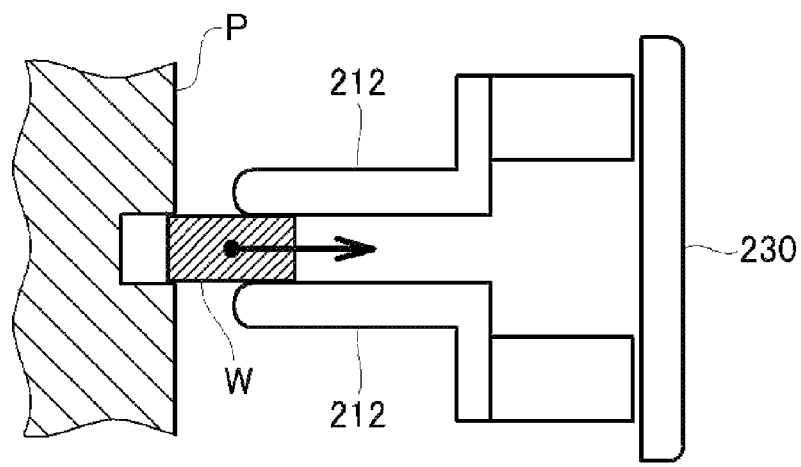
FIGS. 4A and 4B are explanatory diagrams showing advantageous effects in assembling an object gripped by the robot hand according to the embodiment.
Figure 4B:
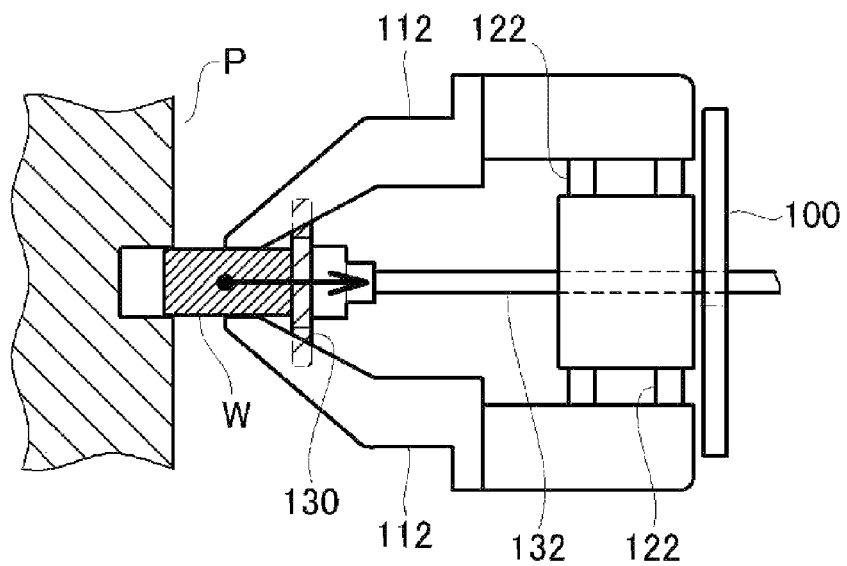

FIGS. 4A and 4B are explanatory diagrams showing advantageous effects in assembling the object W gripped by the robot hand 10 according to this embodiment. In FIG. 4A, a state in which the object W is assembled to a product P using the robot hand 20 in the past explained above as reference is shown. In FIG. 4B, a state in which the object W is assembled using the robot hand 10 according to this embodiment is shown.

As shown in FIG. 4A, when the object W gripped by the robot hand 20 in the past is attached to a recess provided in the product P, friction force is generated in a contact portion of the object W and the recess of the product P. Therefore, reaction (indicated by an arrow in the figure) in a direction opposite to a direction of attaching the object W to the recess acts on the object W. As explained above, the robot hand 20 in the past merely retains the object W between the finger sections 212 with friction force generated in contact portions of the finger sections 212 and the object W (see FIG. 3A). Therefore, when the reaction applied to the object W when the object W is assembled is large to some extent, the object W sometimes shifts to the base side of the finger sections 212. As a result, the object W cannot be assembled to the product P.

As shown in FIG. 4B, when the object W gripped by the robot hand 10 according to this embodiment is attached to the product P, as in the attachment of the object W by the robot hand 20 in the past explained above, reaction in a direction opposite to a direction of attaching the object W acts on the object W. However, with the robot hand 10 according to this embodiment, the object W is supported from the base side of the finger sections 112 by the palm section 130. Therefore, even when the reaction applied to the object W is large, the object W is prevented from shifting to the base side of the finger sections 112. As a result, it is possible to surely assemble the object W to the recess of the product P. The robot hand 10 according to this embodiment can be used for uses explained below besides the use for gripping the object W as explained above.

Figure 5A:
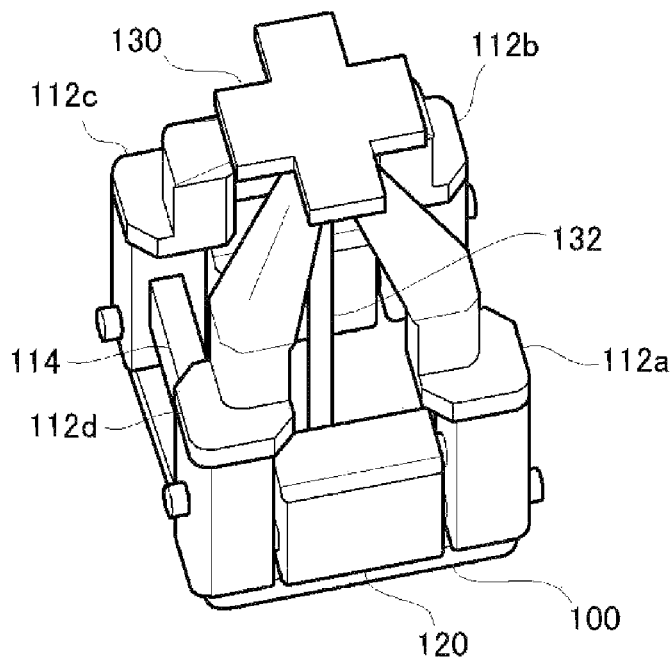
FIGS. 5A and 5B are explanatory diagrams showing another method of use of the robot hand according to the embodiment.
Figure 5B:
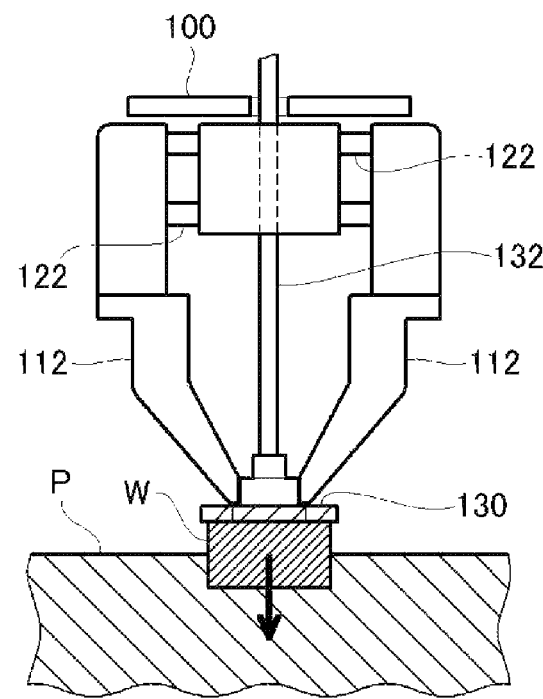

FIGS. 5A and 5B are explanatory diagrams showing another use of the robot hand 10 according to this embodiment. As explained below, the robot hand 10 according to this embodiment is enabled to perform work for pressing the object W positioned in a predetermined position of the product P against the product P and pushing the object W into the product P. In this case, first, the left and right finger sections 112 are sufficiently separated from each other and the palm section 130 is moved in a direction from the bases to distal ends of the finger sections 112. When the palm section 130 moves to a position slightly ahead of the distal ends of the finger sections 112, the separated left and right finger sections 112 are brought close to each other and returned to an original position (the position in the center of the robot hand 10). In this way, as shown in FIG. 5A, portions of the finger tips of the robot hand 10 are changed to a flat surface by the palm section 130. In this state, when the finger tips of the robot hand 10 (i.e., the palm section 130) are brought into contact with the object W positioned in the predetermined position of the product P and the entire robot hand 10 is moved in a direction of an attaching position of the object W. Then, as shown in FIG. 5B, work for pushing the object W into the product P can be performed.

If such a robot hand 10 according to this embodiment is used, both work for gripping the object W (and work for assembling the gripped object W) and work for pressing the object W against the product P can be performed by one robot hand 10. Therefore, since it is unnecessary to separately provide, for example, a robot that performs work for pushing the object W into the product P, it is possible to simplify a manufacturing line.

The work for pushing the object W into the product P can also be executed by directly pressing the distal ends of the finger sections 112 against the object W. However, since an area of the contact portions of the finger sections 112 and the object W (the distal ends of the finger sections 112) is small, it is likely that large pressure is applied to the object W and the object W is damaged. In this regard, if the object W is pushed into the product P by the palm section 130 having an area larger than the area of the distal ends of the finger sections 112, pressure applied to the object W can be dispersed. Therefore, it is possible to prevent the object W from being damaged because large pressure is locally applied. Further, since a contact area of the palm section 130 and the object W is increased, even if large pressure is applied to the object W, it is possible to cause the pressure to stably act. As a result, it is possible to surely push the positioned object W into the product P.

C. Modification

The robot hand 10 according to the embodiment explained above brings the finger sections 112 and the palm section 130 into contact with the object W to thereby grip the object W. For the purpose of detecting that the object W is gripped, pressure sensors may be provided in the finger sections 112 and the palm section 130. In a modification explained below, components are denoted by reference numerals and signs same as those in the embodiment and detailed explanation of the components is omitted.

Figure 6:
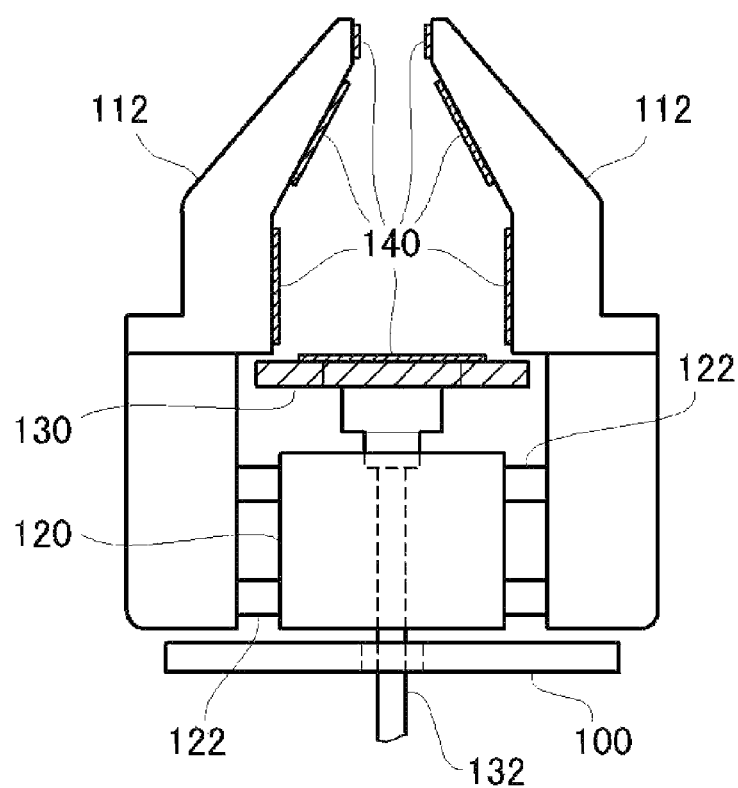
FIG. 6 is an explanatory diagram showing the configuration of a robot hand according to a modification.

FIG. 6 is an explanatory diagram showing the configuration of the robot hand 10 according to the modification. In the finger sections 112 and the palm section 130 of the robot hand 10 according to the modification shown in the figure, pressure sensors 140 are provided on surfaces that come into contact with an object when the object is gripped. In such a robot hand 10 according to the modification, when the object W is gripped, the object W and the pressure sensors 140 come into contact with each other, whereby it is detected that the object W and the finger sections 112 (or the object W and the palm section 130) come into contact with each other. Therefore, it is possible to determine on the basis of a detection result in the pressure sensors 140 whether or not the robot hand 10 grips the object W.

With such a robot hand 10 according to the modification, when it is determined that the object W is not successfully gripped, it is possible to cause the robot hand 10 to perform a gripping action for the object W again or it is possible to perform an inspection of the robot hand 10 and repair the robot hand 10 according to necessity. As a result, it is possible to surely grip the object W with the robot hand 10.

If the pressure sensors 140 are used, when the object W is gripped, it is also possible to detect pressure with which the finger sections 112 or the palm section 130 pushes the object W. Therefore, it is possible to increase or reduce force for gripping the object W by finely adjusting a distance between the finger sections 112 and the position of the palm section 130 according to the detected pressure.

The robot hands according to the embodiment and the modification are explained above. However, the invention is not limited to the embodiment and the modification and can be carried out in various forms without departing from the spirit of the invention. For example, in the robot hands according to the embodiment and the modification explained above, the finger sections provided in the four directions are formed as sets of two adjacent finger sections. The sets of the finger sections move close to or apart from each other in one direction (the left right direction). However, the finger sections may be formed as sets of other two adjacent finger sections. The sets of the finger sections may be allowed to move close to or apart from each other in a direction substantially orthogonal to the one direction (the front back direction).

Figure 7:
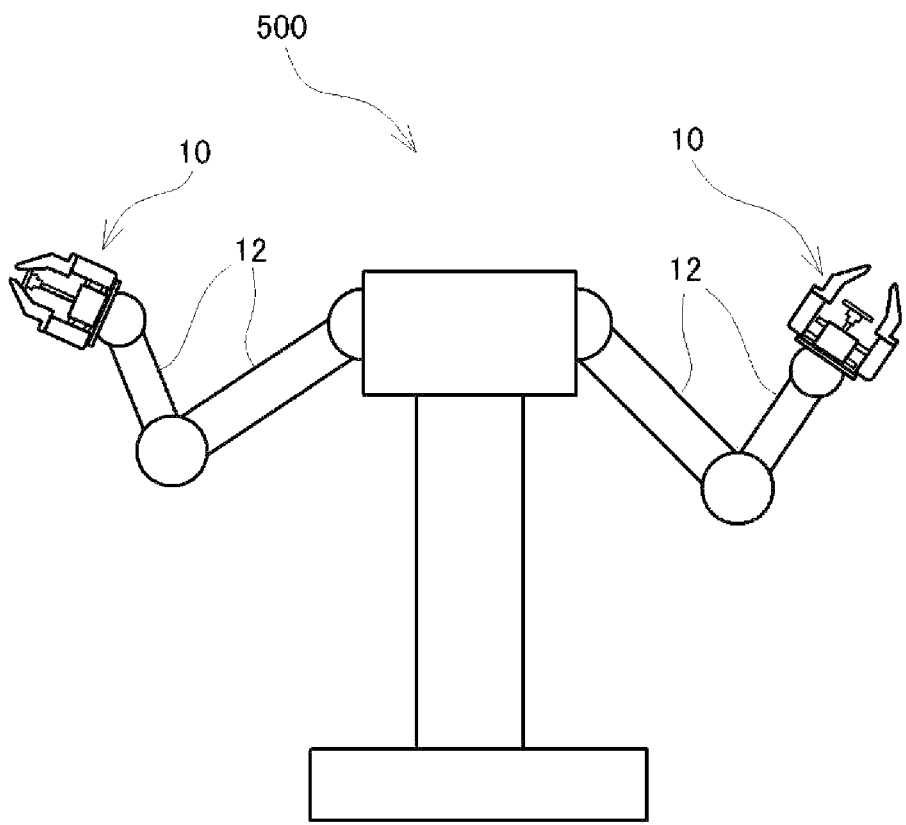
FIG. 7 is an explanatory diagram showing a robot including robot hands.

Since the robot hands according to the embodiment and the modification have extremely simple structures, a reduction in size and a reduction in weight are easy. Therefore, if a plurality of the robot hands according to the embodiment or the modification are mounted at the distal ends of robot arms 12 to configure a robot 500 as shown in FIG. 7, it is possible to obtain a high-performance robot 500 that is, while being capable of coping with various objects W, small and light and prevents energy efficiency from easily falling even if a cycle time is reduced.

What is claimed is:

1. A robot hand comprising:
    a hand base that is a substantially rectangular planar member;
    four finger sections arranged at four corners of the hand base, the finger sections being movable to change a distance between the finger sections; and
    a palm section located at a central position between the four finger sections, the palm section being movable along a direction from a base of the finger sections to a distal end of the finger sections,
    wherein the finger sections are movable to grip an object; and
    wherein each of the finger sections include a gripping surface that are operable to contact the object when the object is gripped by the finger sections, and a distance between the gripping surfaces of adjacent finger sections narrows in the direction from the bases of the finger sections to the distal ends of the finger sections.

2. The robot hand according to claim 1, wherein the palm section is independently movable from the finger sections.

3. The robot hand according to claim 2, wherein the palm section is movable to a position located proximate the distal ends of the finger sections.

4. A robot comprising the robot hand according to claim 3.

5. A robot comprising the robot hand according to claim 2.

6. The robot hand according to claim 1, wherein the palm section is simultaneously movable with the plural finger sections.

7. A robot comprising the robot hand according to claim 6.

8. A robot comprising the robot hand according to claim 1.

* * * * *